United States Patent [19]

Izard et al.

[11] Patent Number: 5,250,153
[45] Date of Patent: Oct. 5, 1993

[54] METHOD FOR MANUFACTURING A MINERAL WOOL PANEL

[75] Inventors: David G. Izard, Wauconda; Mark H. Englert, Buffalo Grove, both of Ill.

[73] Assignee: USG Interiors, Inc., Chicago, Ill.

[21] Appl. No.: 605,727

[22] Filed: Oct. 29, 1990

Related U.S. Application Data

[63] Continuation of Ser. No. 333,384, Apr. 3, 1989, abandoned, which is a continuation-in-part of Ser. No. 2,444, Jan. 12, 1987, abandoned.

[51] Int. Cl.$^5$ ............................................. D21H 13/38
[52] U.S. Cl. .................................... 162/152; 162/168.3; 162/169; 162/175; 162/178; 162/181.1; 162/181.3; 162/181.6; 162/181.8; 162/183; 162/208; 162/212; 162/217
[58] Field of Search ................ 162/101, 145, 152, 169, 162/168.3, 164.1, 183, 158, 184, 181.1, 181.6, 178, 207, 204, 208, 217, 181.3, 181.8, 175, 212

[56] References Cited

U.S. PATENT DOCUMENTS 4,587,278  5/1986  Dotzauer et al. .................. 523/200

FOREIGN PATENT DOCUMENTS 3438388  4/1986  Fed. Rep. of Germany .
2383899  3/1977  France .
2383800  10/1978 France .
49-29901  8/1974  Japan ............................... 162/207
493357  12/1974 U.S.S.R. .
675044  7/1979  U.S.S.R. .

*Primary Examiner*—Peter Chin
*Attorney, Agent, or Firm*—Robert H. Robinson; John M. Lorenzen

[57] ABSTRACT

The manufacture of sag-resistant, lightweight structural mineral panels on a foraminous support wire is accomplished by forming a dilute aqueous dispersion of mineral fiber and/or aggregate and an anionically stabilized latex binder, coupling the binder solids onto the mineral fiber materials by adding a small amount of a flocculant such as a cationic polyacrylamide, and passing the slurry onto a first flooded section of the support wire to form an open, entangled, structural mass having water in interstitial spaces of the entangled mass. Water is stripped from the mass and the mass dried without collapse of the open structure by passing heated dry air through the open entangled structure.

14 Claims, 2 Drawing Sheets

METHOD FOR MANUFACTURING A MINERAL WOOL PANEL

CROSS REFERENCE TO RELATED APPLICATIONS

This application is a continuation of application Ser. No. 333,384, abandoned which is a continuation-in-part of co-pending application Ser. No. 2,444, filed Jan. 12, 1987 abandoned.

BACKGROUND OF THE INVENTION

1. Field of the Invention

This invention relates to a method for making strong, sag-resistant structural panels of mineral wool and/or mineral aggregate that may vary from less than 8 to about 20 pounds per cubic foot or more. More particularly, it relates to a rapid, practical process for forming and "flow through" air drying a mineral wool panel continuously on a Fourdrinier wire. These panels may be used as acoustical ceiling tiles, thermal insulating panels, sound absorbing panels, pipe and beam insulation and the like products.

2. Description of the Prior Art

The water felting of dilute aqueous dispersions of mineral wool and lightweight aggregate is known. By such methods, a dispersion of mineral wool, lightweight aggregate, binder and other adjuvants are flowed onto a moving foraminous support wire screen, such as that of an Oliver or Fourdrinier mat forming machine for dewatering, at line speeds of about 10–50 feet per minute. The dispersion dewaters first by gravity and then vacuum suction means; the wet mat is dried over a number of hours in heated convection drying ovens, and the product is cut and optionally top coated, such as with paint, to produce lightweight structural panels such as acoustical ceiling products. Such methods cannot produce low density structural products below about 12 pounds per cubic foot density. A "structural" panel, as used herein, is capable of supporting its own weight without visible sagging, bending, or collapsing when supported only at the edges of the panel as in a suspended ceiling grid.

For many years a premium grade of acoustical ceiling tile has been made by a wet-pulp molded process similar to that described in U.S. Pat. No. 1,769,519. The product is formed by bonding nodules of mineral wool with a viscous cooked starch gel. The wet pulp contains about 83–87% by volume (and about 68–75% by weight) water that is necessary to provide proper forming and acoustical properties to the wet pulp. The wet pulp is "screeded" by passing the pulp under an oscillating bar or rotating endless loop belt and the like. The screeding action, by the friction of the bar or belt against the viscous pulp, disrupts some groups of the nodulated mineral wool on the surface of the pulp, creating crevices and fissures in the surface that permit sound wave penetration and impart a visually pleasing appearance. The screeded pulp is then dried in a convection oven for about 12 hours or more. During drying, the water is removed providing a highly porous product with excellent sound absorbing properties.

U.S. Pat. Nos. 1,996,032 and 1,996,033, describe various compositions and methods of wet forming such molded acoustical tiles from a thick aqueous pulp of nodulated mineral wool.

U.S. Pat. No. 3,510,394 discloses flocculating inorganic kaolin clay in dilute dispersions of mineral fiber. Flocculation to clumps or flocs of the clay with starch grains is effected by adding extremely small amounts of flocculant such as polyacrylamide just before the slurry is dewatered, and the wet mat is baked or fired in addition to conventional drying. Dewatering time is increased by this flocculation treatment.

U.S. Pat. No. 4,613,627 discloses a modified wet pulp process for forming an acoustical ceiling tile wherein the binder is foamed separately from the rest of the solid ingredients. The foamed binder is then combined with an admixture of the other solids, and the admixture is cast, screeded, textured, press molded and dried.

The use of foam to prevent stratification of the various particles in a slurry of mineral wool, aggregate and other solids during the water felting of mineral fiber panels is taught by Guyer et al in U.S. Pat. No. 4,062,721. The foam retains the particles in a space matrix but also increases the water drainage time according to Guyer et al who solve that problem by delaying the foaming of the furnish until after gravity drainage has occurred. Guyer et al teach that more water is removed because the foam reduces the gross porosity of the furnish thus making vacuum dewatering more effective. This means that air is not passing through the furnish but pressing down on it and reducing the porosity still further.

Bryant teaches in U.S. Pat. No. 1,841,785 that a tough coherent skin of paper-like consistency may be created on the lower surface of a foamed mass of cellulose fibers and water on a Fourdrinier wire by subjecting the lower surface momentarily to a vacuum without imparting the suction deeply into the mass so that only the lower surface area is compacted. Further dewatering of the foamed mass occurs under a lesser vacuum so that the fibrous body of the mass is not broken down or compacted. The still wet fibrous body is then dried by passing it through an oven into which hot air is blown at levels above and below the fibrous body. The spongy consistency of the body, except for the tough skin, is thus preserved.

Current water-felted and cast acoustical panels exhibit limited stability under high moisture loads. This undesirable characteristic is associated with the hydrophilic nature of the cellulosic fibers used in many such products or the starch binder used there and in mineral fiber panels. There has been interest in latex resins as binders but their high cost and high loss in the water felting procedure have been discouraging. Moreover, regardless of the type and cost of the binder, two major factors in the cost of producing acoustical structural panels have been the energy and the time expended for the dewatering and drying of the felted fibers.

This problem has been addressed in U.S. Pat. No. 4,587,278 wherein Dotzauer et al teach the use of certain thermoplastic polymers as the binder for mineral fibers in a sound insulating board. The polymer may be added to an aqueous suspension of mineral fibers and then precipitated onto the fibers by the addition of a cationic polymer dispersion or a salt of a polyvalent metal. Dewatering of the suspension is done on a sieve under reduced pressure and with gentle pressing. Infrared lamps, hot air or microwaves are used to dry the resulting sheet at from 110° to 220° C. Dotzauer et al teach that the migration of the polymer particles during drying may be prevented by adding heat sensitizing agents to the polymer dispersion before the sheet-forming procedure is commenced. The drying time reported is from 36 minutes to 3 hours.

Before Dotzauer et al's use of the thermoplastic polymers as binders, Waggoner taught in U.S. Pat. No. 3,228,825 that cellulosic fibers and inorganic fibers such as asbestos and rock wool may be used as binder fibers in forming glass fibers into a felted mass. The binder fibers cling to the surface of the glass fibers and a mechanical interlocking of the binder fibers causes the felting to occur. They also function as spacers to separate the glass fibers in the felted mass. When used as taught, the binder fibers do not cause a problem in the elimination of the water; it is possible to suck hot air through the deposited fibrous structure so that drying can be achieved in a short time.

Now, it has been discovered that a latex binder may be coupled to the mineral fibers as the sole binder in an aqueous slurry to form a wet open mass of entangled fibers so strong that it does not collapse when air is blown through it to achieve rapid drying.

It is an object and advantage of the present invention, therefore, to provide a method for manufacturing low density, structural panels by the wet felting of mineral fibers without having to dry extremely large amounts of water out of the wet mass over long periods of time.

It is another object of this invention therefore, to provide a self sustaining, highly voided, wet mass of entangled mineral fibers which withstands the force of high velocity streams of air rushing through it.

A further object is to provide strong mineral fiber panels having densities between 3-10 pounds per cubic foot and a modulus of rupture at least about 30 pounds per square inch for the core of the panel.

Another object is to provide mineral fiber and/or lightweight mineral aggregate structural panels which have excellent strength and integrity at densities up to about 22 pounds per cubic foot or more.

Another object and advantage is to provide a low cost method and a composition for manufacturing rigid acoustical ceiling tile which exhibits good strength and little if any sag or warpage in dry or humid conditions.

A still further object and advantage is the provision of a practical method for manufacturing lightweight mineral fiber panels wherein the dewatering and drying of a latex resin bonded mat may be accomplished in a facile, rapid manner such that the mat is dewatered and dried in as little as 10 minutes.

The above objects and advantages, and others which will become more apparent from the drawings and the ensuing description, are accomplished by forming a dilute aqueous dispersion furnish of mineral fiber and/or mineral aggregate and an anionically-stabilized resin latex binder, such as a polyvinyl acetate. Almost at the end of mixing, a small but effective amount of a flocculant, such as a cationic polyacrylamide, is added and the furnish is passed to a flooded section of a drainage wire of a foraminous mat forming apparatus. In this system and at the levels added, the flocculant does not cause clumping of the latex particles with each other. Rather, it acts as a coupling agent, the latex particles being dispersed throughout the water and coated upon the mineral materials. Virtually all of the binder resin solids added to the system become coupled to the mineral surfaces in the wet felted product, with very low losses of binder resin in the drainage section white water. Thus, the drainage water need not be recycled to avoid substantial losses of binder solids. The mat contains almost half the total solids of a cast pulp but may be dried in a matter of minutes rather than many hours by passing large volumes of heated air through it. By adding various proportions of aggregate in this particular method of felting, water stripping and drying of the panel products as open, porous structures may be performed at various densities, ranging from about 3 to about 22 pounds per cubic foot or more.

DESCRIPTION OF THE PREFERRED EMBODIMENTS

Figure 1:
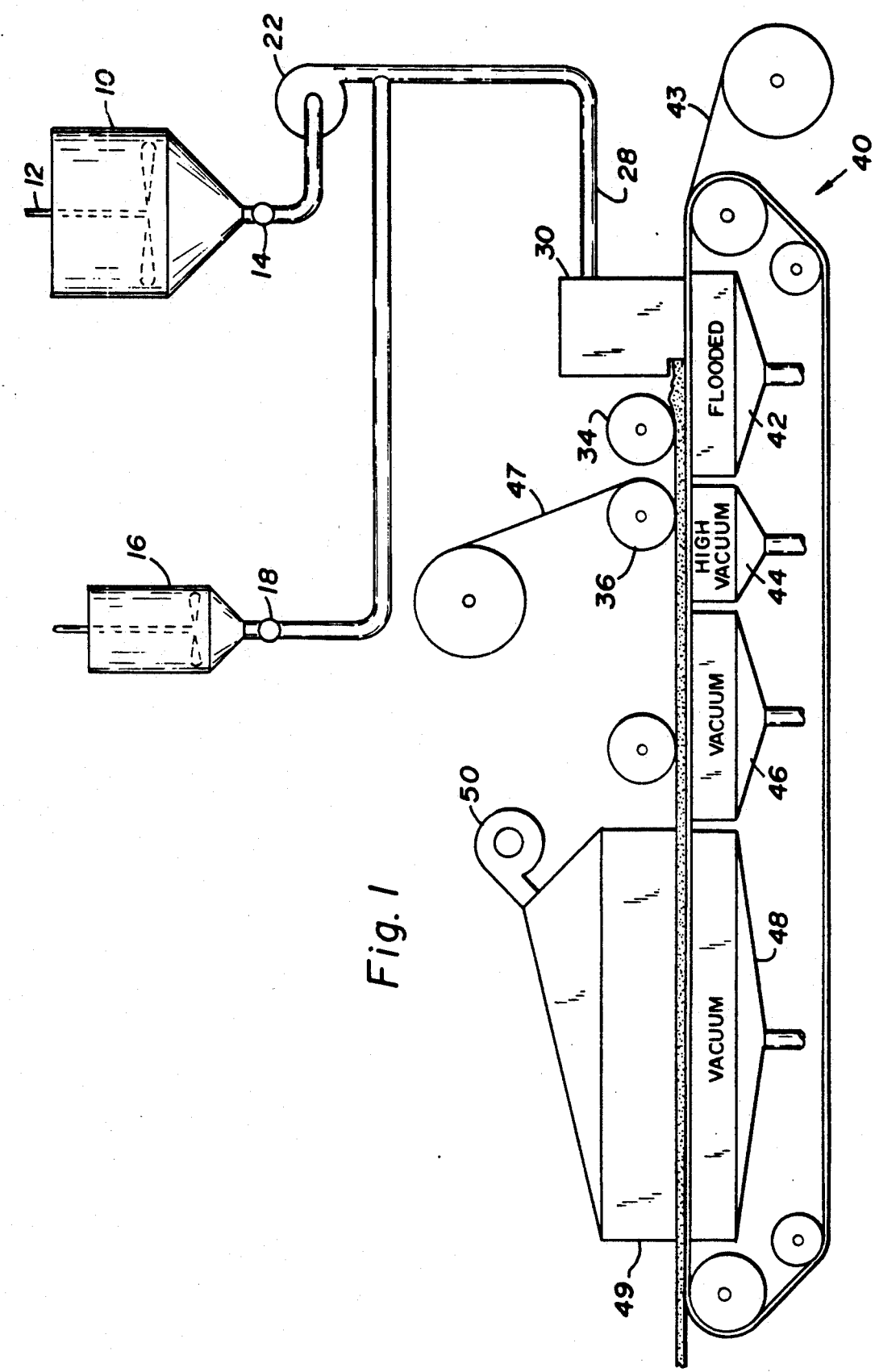
FIG. 1 is a schematic diagram of a mineral board manufacturing process in accordance with the present invention.

The fiber material for use in the present invention may be any of the conventional mineral fibers prepared by attenuating a molten stream of basalt, slag, granite or other vitreous mineral constituent. The molten mineral is either drawn linearly through orifices, commonly referred to as textile fiber, or it is recovered tangentially off the face of a spinning cup or rotor, commonly referred to as wool fiber. Ceramic fibers may also be used. Expressed in terms of the dry solids content of the final panel product, the fiber constituent is suitably present in an amount up to about 95% by weight, preferably from 60% for higher density but about 30-45% for the lower density panels. For reasons of convenience and economy, mineral wool is the preferred fiber material.

To provide for an increased variety of decorative surfaces, a modulated mineral wool may be employed. It imparts an improved formability to the furnish so that desired shapes and patterns are easily obtained. It may be purchased as granulated mineral wool or it may be made by mixing a 5 to 10% solids slurry of mineral wool in water under high shear conditions for about 5 minutes. Highly porous, irregularly shaped balls about the size of a pea or smaller (about 1/64 to about ⅛ inch) are formed. When used, the nodulated fibers constitute about half or more of the total dry solids, preferably from about 60 to about 95 weight % of the acoustical panel. From about 65 to about 85% is even more preferable.

The mineral aggregate ingredient may be a lightweight inorganic aggregate of exfoliated or expanded volcanic glass origin. Such aggregate includes the well known expanded perlite, exfoliated vermiculite, exfoliated clay and the like products which are available in a variety of mesh sizes. Generally, mesh sizes smaller than 8 mesh are suitable, although this is not critical. Expanded perlite is a preferred aggregate for reasons of availability and economy. The amount of aggregate included may range up to about 85% or more on a dry weight basis in the final product. For low density products, the lightweight aggregate will generally constitute 30-65% of the product. Higher density versions of the products, having densitities up to about 22 pounds per cubic foot (0.36 g/cm$^3$) or more, may be produced by employing higher density mineral aggregate such as stucco (calcium sulfate hemihydrate), gypsum, clays, limestone or the like.

The latex binder used in the present invention may be any commercially available anionically-stabilized resin latex containing active acrylic groups, acetate groups, or butadiene-styrene moieties in various homopolymers, copolymers or mixtures thereof. For economy and availability, polyvinyl acetate (PVA) is preferred and any of the commercially available PVA latex resins containing an anionic particle charge emulsifier may be used, such as X-LINK latex or RESYN latex resins from National Starch and Chemicals Corporation, or the SYNTHEMUL 97-611 vinyl acetate/acrylic latex emulsion from Reichold Chemicals, Inc. Said resins often have a glass transition temperature (Tg) of about 29° to 35° C. Other anionic type synthetic resin latices such as vinylidene chloride, polyvinyl chloride, nitrile rubber, carboxylated acrylonitrile, polychloroprenes such as neoprene and the like or copolymers thereof may be used singly or in combination. The anionic polyvinyl acetate latex binders are available in various concentrations having a full range of viscosities. These polymers are available in a pH range of about 1-8 more often about 4 to about 8, although other pH ranges that do not adversely affect the mineral material may be used. They are commercially available in a range of particle sizes of about 0.1 to 2 micrometers or microns.

When a nodulated mineral wool is used and, indeed, when any acoustical panel likely to see high temperature service is being made by the method of this invention, a binder having a Tg of from about 35° C. to about 110° C. is preferred. More preferred is a binder having a Tg of from about 60° C. to about 100° C. Examples of such a binder include a styrene/acrylic copolymer latex having a Tg of 100° C. sold as XU30776.00L by Dow Chemical, a carboxylated styrene/butadiene latex (Tg=65°-70° C.) sold under the trademark 76 RES 4106 by Unocal Chemicals Division of Union Oil Company of California, another carboxylated styrene/butadiene having about 83% styrenic content and a Tg of 38°-44° C., a carboxylated styrene latex having a Tg of 100° C., (STYROFAN 4900), both sold by BASF, and a polyvinyl chloride having a Tg of 40° C. sold under the trademark GEON 460X49 by B. F. Goodrich.

In addition to a latex binder, a starch may be used as a co-binder to offset the high cost of the latex still more if it is cooked so that the temperature rise is stopped after adhesive properties have been achieved but with reference to the inflection point on the viscosity/temperature curve for a particular starch to avoid a sharp increase in the viscosity. A viscous starch dispersion must be avoided so that the felted mass is not plugged up and flow through drying is made impossible. Strength and hardness may be imparted to the product, also. Suitable starches include a pearl starch and a wheat starch containing about 6% protein by weight such as GENVIS 600 wheat starch from Ogilvie Mills, Inc.

The binder solids may be present in the final product on a dry weight basis in an amount ranging from about 1% to about 35% depending upon the amount of mineral fiber, amount of lightweight aggregate, and the degree of stiffness and strength desired for the core of the final panel product. From about 2% to about 25% is preferred, from about 2% to about 10% more so. The starch co-binder may be as much as about 80% of the weight of the binder solids. Thus, the binder in this invention may be from about 20 to 100 weight percent resin latex and from 0 to about 80 weight percent starch. At the higher levels of starch, a flocculant aid such as mentioned below becomes increasingly important. It is preferred to keep the amount of starch at less than 70 weight percent.

Heretofore, the high levels of resin loss in the methods used to make mineral fiber panels precluded the use of latex dispersion like polyvinyl acetates. In the method of this invention there is almost no latex binder loss. Mineral surfaces such as on the fibers and mineral aggregates disclosed herein carry a slight residual negative charge. In the present invention, the remaining essential ingredient is a coupling agent. A preferred material is a cationic flocculant that carries a residual positive charge. When it comes into contact with the negative charge on the mineral fiber or the mineral aggregate, an electrostatic interaction occurs which bonds the flocculant to the mineral surface. An excess positive charge on the flocculant acts to couple the anionic resin latex binder to the cationic flocculant. In effect, the cationic flocculants of the types called for herein appear to be acting to couple the latex binder to the mineral fibers and/or the mineral aggregate particles without clump formation. A marked advantage of the present invention is the improvement in retention of binder solids in the final product when using an anionically stabilized synthetic polymeric latex binder and the proper amounts of cationic flocculant. Retention of the latex binder in the final product on a dry solids basis was improved from about 25-40% when the cationic flocculant was not present to over 95% when using the flocculant in accordance with this invention. Generally, the amount of latex retained in the core of the final product will be about 99 weight percent of the amount of latex added to the furnish, on a dry solids basis.

Suitable cationic flocculants for use in the present invention have molecular weights of about 1-12 million and at least about 5 mole percent of a cationic component. Thus, when the cationic charge of the flocculant arises from the polymerization of a mixture of monomers, at least about 5 mole percent of those monomers will be cationic such as a dialkylaminoacrylamide or a dialkylaminoalkyl methacrylate. A polycrylamide having at least 10 mole percent of a cationic component is a preferred flocculant; more preferred is one containing from about 20% to about 40 mole percent. Examples of such include polyacrylamides sold under the trademarks CYANAMIDE E1901, BETZ 1266, and PERCOL 292. Other cationic flocculants useful herein are exemplified by polyamines sold under the trademarks CYPRO 516, HENKEL SC5062, and BETZ 1181. A cationic guar gum derivative sold by Henkel under the trademark GENDRIV 162 further exemplifies the flocculant used in this invention. Strongly cationic homopolymers such as poly (2-hydroxypropyl-1,1-N-dimethyl-ammonium chloride) are also contemplated as being useful in this invention, as are the cationic cymene resins.

Depending upon the particular cationic flocculant and the latex binder used to carry out the method of this invention, the amount of flocculant to achieve complete deposition of the active binder solids on the surface of the mineral materials may vary. The concentration of flocculant present in the dispersion, however, does markedly effect the level of binder retention. A concentration between 2% and about 4% solids based on the weight of the latex resin solids generally provides excellent retention. The flocculant may range from about 0.1% to about 15% by weight based on the binder resin solids, although somewhat more or less may be used without further apparent advantage.

In normal practice, the cationic flocculant will be diluted to about 1% by weight active ingredients prior to its addition to the mineral fiber dispersion although other concentrations may be effective.

The contact time of the flocculant (more precisely—the coupling agent) with the furnish may be very short—from less than 1 second to about 16 seconds but it may be as much as one minute depending on the line speed, the concomitant flow rate and shear rate of the furnish and the distance between its injection point and the foraminous wire. Little or no shear should arise from the flow of the furnish. The need for a relatively quiescent flow of the furnish after addition of the coupling agent is shown by the severe nodulation and decoupling that occurs within one minute when the furnish is stirred at 210 rpm.

After coupling the anionic latex binder and any further desired materials onto the mineral wool with the cationic flocculant, the furnish containing from about 3% to about 10% solids is flowed onto a Fourdrinier wire or the like where it is rapidly dewatered and dried. This is preferably accomplished by blowing hot air through the wet mass while pulling a partial vacuum of from about 0.4 to about 20 inches of mercury at the underside of the wire. A vacuum of about 8-20 inches of mercury may be momentarily applied, followed by a lesser vacuum of about 10-20 inches of water (0.7-1.4 inches of Hg) and then about 6-10 inches of water (0.4-0.7 inch of Hg), all while blowing large volumes of high velocity air through the entangled mass of fibers. A sustained vacuum of about 4 inches of mercury is preferred during the flow-through air drying. The vacuum serves to set up a path for the air through the wet mass. The volume-velocity of the air may be from about 50 to about 350 cubic feet per minute per square foot of the area of the surface at which the air is directed and through which the air passes. The air may be at ambient temperature but faster drying may be achieved without damage to the open structure by heating the air to temperatures as high as about 400° F. (204° C.). The temperature at the evaporation interface is about 135° F. even when the hottest air is used.

The open structure of the wet mass of entangled fibers and other solids is a surprisingly strong, self-sustaining structure, surviving the impact of the air rushing through it without suffering substantial collapse.

Optionally, one or more woven or nonwoven fiber web cover sheets, such as glass fiber scrims, may be applied to the mineral fiber/aggregate core during manufacture of the lighter weight panels. When used, it is preferred to utilize a porous nonwoven scrim fabric, such as that available under the designation of "Battery" type scrim, having a weight of about 0.4-2.5 pounds per hundred square feet of scrim. If a cover scrim is utilized, it may be necessary to provide an additional binder application as by spraying or roll coating the scrim with resin latex binder before the scrim is applied to the core in order to provide additional adherence between the core and scrim.

Other ingredients may also be present in the pulp such as dyes, pigments, antioxidants, surfactants, water repellents, fillers, fire retardants, and the like. Suitable fillers include perlite, vermiculite, mica, wollastonite, silica, fly ash, gypsum, stucco (calcined gypsum) limestone, kaolin, ball clay, and the like. Surfactants include anionic surfactants such as linear alkyl sulfates and sulfonates and nonionic surfactants such as modified diethanolamide. Adding a small amount of the cationic coupling agent with the fillers and pigments appears to increase their retention. Colorants coupled to the mineral wool together with the latex impart intense integral colors to the product. A divalent or trivalent cation, such as calcium ions from calcium sulfate, may be used as a flocculation aid and to reduce the required level of polyacrylamide.

The following specific examples will further illustrate various specific embodiments of the present invention. Unless specified to the contrary all amounts are expressed as parts by weight on a dry solids total weight basis. Of course, it is to be understood that these examples are by way of illustration only and are not to be construed as limitations on the present invention.

EXAMPLE 1

A dilute dispersion of about 3% by weight solids consistency was formed containing approximately 53% expanded perlite, 35% mineral wool that had not been treated to remove contained shot, and 12% solids of an anionically stabilized polyvinyl acetate latex. The formulation was mixed to homogeneity over 1-3 minutes and then a 2% cationic polyacrylamide solution was added to provide approximately 1% polyacrylamide based on the total weight of solids of the panel product on a dry weight basis. Upon addition of the polyacrylamide solution, the cloudy dispersion of the expanded perlite, mineral wool and polyvinyl acetate became clear, and it was observed that the mineral wool fibers had become coated with the polyvinyl acetate particles.

EXAMPLE 2

The following Example should be read with reference to FIG. 1 which shows a schematic diagram of a method in accordance with the present invention.

A dilute mineral fiber furnish was prepared by first charging to water in primary mix tank 10 a quantity of mineral wool, then an anionically-stabilized polyvinyl acetate binder latex having a viscosity of 50-200 centipoises (cps) at 25° C., pH of 4.5 and a glass transition temperature (Tg) of 33° C., and finally expanded perlite. This furnish was mixed by a motor-driven impeller 12 for 2-4 minutes to achieve homogeneity. Flows from mix tank 10 were proportioned by valve 14 to provide a furnish of about 3% by weight solids concentration, with the individual ingredients proportioned to each other on a dry solids basis of about 44% mineral wool, 44% expanded perlite, and about 12% polyvinyl acetate latex active solids. A cationic polyacrylamide having a molecular weight between 8 and 12 million, viscosity of about 1000 cps and 30 mole percent of a cationic component was added to secondary mix tank 16 and metered into the furnish via valve 18 at a rate to provide the polyacrylamide proportioned to the other ingredients on a dry solids basis of about 0.4% (and proportioned to the resin latex binder on a dry basis of 2.6% by weight of latex solids).

Figure 2:
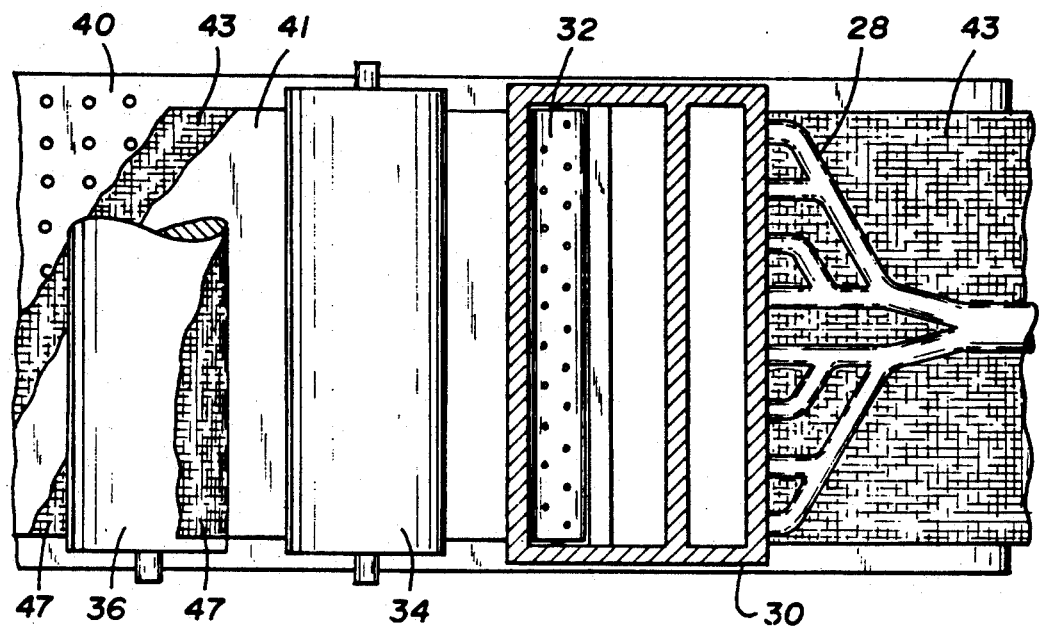
FIG. 2 is a top view cross section of a part of the manufacturing line showing the modified forming box apparatus of FIG. 1.

A pump 22 transferred the furnish to a modified flow head box 30 above a conventional moving foraminous wire screen of a mat forming machine, hereinafter and commonly referred to as the wire 40. The functions of the modified head box 30 were to allow the furnish to consolidate and mature to provide for the ionic coupling of the polyvinyl acetate binder solids to the mineral wool and perlite as the furnish passed through the branched feed pipe 28 (shown more particularly in FIG. 2) and through the convoluting channel course within the modified head box 30 (shown more particularly in FIG. 3) and onto wire 40 as layer of furnish solids mass 41. By providing a perforated roll 32 having multiple passageways through its diameter for fluid flow located within head box 30 and also smoothing roller 34 above wire 40 just after the mass 41 is deposited upon wire 40, a velocity transition zone to a first flooded section 42 on wire 40 was established to allow for further ionic coupling of the solids in mass 41 as an evenly spread, open, highly voided, entangled mass having water in the interstitial spaces thereof.

Figure 3:
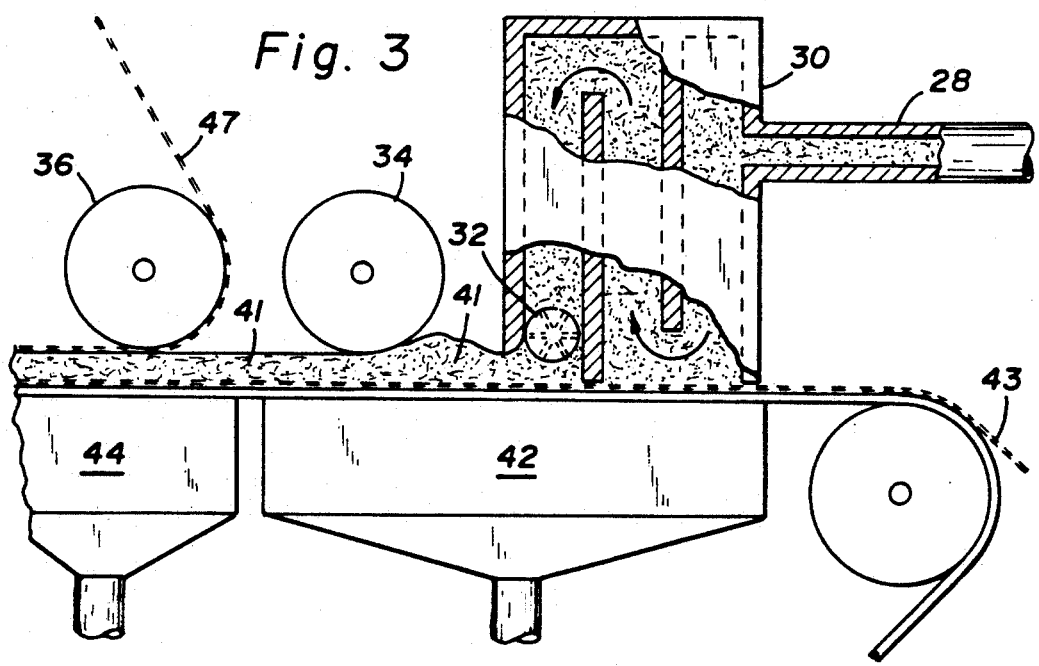
FIG. 3 is a side view sectional of the same part of the manufacturing line as FIG. 2.

A continuous scrim bottom cover sheet 43, such as of nonwoven Battery scrim having a weight of about 0.8–2 pounds per 100 square feet of scrim, was laid about wire 40 before the mass 41 cascaded out of box 30 onto wire 40. A similar scrim top cover sheet 47 was overlaid at the smoothing roller 36. By feeding the top sheet 47 and bottom sheet 43 as shown in FIG. 3, an intimate contacting of the cover sheets with the mass 41 was provided.

The core mass 41 cascading out of head box 30 was deposited upon and then floated through water flooded section 42 of the wire 40 for a few seconds before encountering the vacuum sections 44, 46 and 48. In high vacuum section 44, a partial vacuum pressure differential equivalent to about 8–20 inches of mercury was applied in brief pulses across the surface of the core 41 in order to begin stripping water from the wet mass without any substantial collapsing of the open, voided structure which had been formed in flooded section 42. A lessened pressure differential equivalent to about 5–70, and preferably about 14, inches of water was maintained across the surface of mass 41 in vacuum section 46, and in section 48, the same vacuum pressure differential was augmented with positive pressure dry air flow through enclosure 49 from blower 50. The blower 50 provided dry heated air to assist continued stripping of water and drying of the wet mass 41. The blower was operated to provide air through mass 41 at a volume-velocity of about 50–350 and preferably about 300 cubic feet per minute of air per one square foot of mat surface with the air at a temperature of about 37°–180° C. The time for a segment of core 41 mass to pass through section 48 was varied considerably, generally averaging 1–2 minutes, to produce a panel of nominal ½ inch thickness. The panel had a core of uniform, small-sized voids averaging about 1/64th inch diameter, a density of 6.5 pounds per cubic foot, and was quite strong although flexible with the two cover sheets in place. Testing the core alone after stripping off the scrim cover sheets gave a modulus of rupture of about 45 pounds per square inch, while testing with the cover sheets gave 150 pounds per square inch.

In further evaluations, the amount of perlite was varied between about 26% and about 43%. The amount of mineral wool used was also varied in a manner such that the sum of the perlite and mineral wool accounted for 88% by weight of the total solids of the furnish. It was found that increases in the perlite-to-mineral wool ratio yielded in a linear fashion a progressively lighter, weaker and more flexible core.

On a weight basis, the strength of the core remained relatively constant when these values were corrected for the changed density of the different samples. It was also found that about 2% of the perlite processed became broken and settled out onto the bottom facing sheet.

EXAMPLE 3

The procedure of Example 2 was repeated with proportioning of the ingredients to each other on a dry weight solids basis of about 52% perlite, about 35% mineral wool, about 12.5% polyvinyl acetate and about 0.45% polyacrylamide. Different cationic polyacrylamide materials were used as follows:
  (1) Cationic polyacrylamide having a molecular weight of about 1 million, about 30 mole percent cationic monomer copolymerized therein and a viscosity of 1050 centipoises at 25° C.;
  (2) Cationic polyacrylamide having a molecular weight of 4–6 million, about 15 mole percent cationic monomer copolymerized therein, and a viscosity of 1400 centipoises at 25° C.;
  (3) Cationic polyacrylamide having a molecular weight of 8–12 million, about 35 mole percent cationic monomer as a copolymerizate, and a viscosity of 100 centipoises at 25° C.

Each of the different cationic polyacrylamides performed satisfactorily with results equivalent to those obtained in Example 2.

In still further evaluations, the amount of polyacrylamide in the first set of evaluations in this Example was varied from 0.72% to 8.6% based on the dry active solids of the binder. All levels performed satisfactorily. As the amount increased to 3%, the percentage of polyvinyl acetate binder retained also increased. At levels above 3% for the particular polyacrylamide used, the percentage of binder retained declined slightly. Modulus of rupture increased linearly with the amount of binder retained.

EXAMPLE 4

In another evaluation following the procedure of Example 2, the following furnish was prepared:
  64.78 parts mineral wool
  25.91 parts calcium sulfate hemihydrate
  9.07 parts anionically stabilized carboxylated styrene-acrylic resin latex binder having a Tg of 100° C.
  0.16 part cationic polyacrylamide of 8–12 million molecular weight and 30 mole cationic monomer as a copolymerizate, and
  9.08 parts lauryl alkyl sulfate anionic surfactant.

The resulting panels had a density of 16.88 pounds per cubic foot and tested, with the top cover sheet removed, to a modulus of rupture of 95.9 pounds per square inch and modulus of elasticity of 10,131 pounds per square inch. Further panels were made applying only a bottom layer scrim sheet during manufacture, imparting a textured surface to the uncovered face after removing the panels from the drier 49 after approximately two minutes, and passing the panels for completion of drying in a conventional manner by passing heated dry air over the surfaces of the panel in a convection oven rather than through the interstices within the panel. The physical properties of this panel approximated those of the other panels in this Example tested after removal of the top cover sheet.

In Examples 5 and 6, below, mineral fiber was mixed with water for about 3–5 minutes at a solids concentration of approximately 7–10% in order to fully nodulate the wool. Then any other optional fiber, aggregate, or fillers were added to the nodulated wool and water mixture with an additional one minute mixing time for each sequential ingredient addition. This was followed by addition of the binder latex with about 15 seconds additional mixing. The cationic polyacrylamide coupling agent was then added followed by an additional 15-30 seconds mixing to couple the binder to the mineral fiber and any optional aggregate or supplemental fibers. A glass fiber scrim backing, such as nonwoven battery type scrim having a weight of 2 pounds per one hundred square feet was placed into a vacuum forming box and the watery pulp was poured into the box to form panel samples, one foot by one foot in size. The surface of the poured pulp was smoothed by a screed bar and the formed panel dried for about 15 minutes in a flow-through configuration. In this manner of drying, a brief burst of vacuum of about 25 inches of water (1.85 inches Hg) was applied to the pulp in the vacuum box while heated dry air having an inlet temperature of approximately 107° C.–140° C. was passed through the pulp. Thereafter, the panels were removed and samples cut from each panel for physical testing of flexural strength using an Instron model 1130 test instrument. In some instances modulus of rupture values (MOR) were corrected to a standard density of 23 pounds per cubic feet (pcf) for more direct comparison to standard conventional cast acoustical ceiling tile such as made by the method of U.S. Pat. No. 1,769,519.

EXAMPLE 5

A panel produced from ingredients proportioned as follows:
  64.8 parts mineral wool
  25.9 parts inorganic particulate filler-powdered calcium sulfate hemihydrate
  9.1 parts vinyl acetate/acrylic copolymer, Tg 33° C. ("Union RES 2302" from Unocal Chemicals Division), and
  0.2 part cationic polyacrylamide having a molecular weight of 1-8 million and about 30 mole percent cationicity (E-1901 from American Cyanamid Co.)
had a density of 16.6 pcf, modulus of rupture (MOR) of 110.4 psi and modulus of elasticity (MOE) of 7977 psi. Average NRC was equivalent to a commercially available cast ceiling tile.

EXAMPLE 6

An acoustical tile prepared with the following materials:
  73.0 parts mineral wool
  17.2 parts Gardner ball clay filler
  9.7 parts styrene acrylic copolymer having a Tg of 33° C. and film forming temperature of 40° C.
  0.1 part cationic polyacrylamide as in Example 5
had a density of 15.1 pcf, MOR of 84.7 psi and MOE of 9,108 psi. Three-fourths inch thick by 12 inch by 12 inch samples exhibited less sag than the same sized control panels of a commercial fire resistant acoustical tile on high temperature exposure (5 minute graduated temperature increases from 538° C. to 1010° C. Other samples exhibited equal noise reduction coefficients and large scale fire test performances when compared to the commercial tile.

Equivalent results were obtained with the same formulation using a number of different anionically stabilized resin latices including:
  DOW XU-30776.00L styrene-acrylic latex having a Tg of 100° C.
  UNOCAL 76 RES 4106X-1 carboxylated styrene-butadiene having a Tg of 65°-70° C.
  POLYSAR L9010P carboxylated styrene-butadiene having a Tg of 38°-44° C.
  POLYSAR L3013 carboxylated styrene having a Tg of 100° C.

EXAMPLE 7

Mineral wool, 128 pounds, and stucco (calcium sulfate hemihydrate), 5.8 pounds, were mixed with 225 gallons of water in tank 10. The stucco was added at its level of solubility in the water as an aid in increasing flocculation efficiency between the cationic coupling agent, the anionically stabilized latex and the nodulated mineral wool. A Lightnin brand propeller mixer was used to mix the stock until the mineral wool became nodulated as uniform granules measuring 5-7 millimeters by 2-4 millimeters.

After the mineral wool has been thoroughly nodulated, 12.8 pounds (on a solids basis) of the anionically stabilized styrene/acrylic copolymer latex (XU30776.00L from Dow Chemical Company) was added and mixed and, as the material was pumped out of the mixing tank 10, about 0.8 pound of a cationic polyacrylamide coupling agent having 20 mole percent cationic monomer as a copolymerizate (XD30598.05 flocculant made by Dow Chemical Company) was injected via valve 18 into the pipe 28 and head box 30, where it interacted with the fiber and latex for several seconds before the suspension flowed across the face of the moving wire 40.

The 7% solids suspension was pumped at the rate of about 21 gallons per minute onto a 30 inch wide screen moving at about 5-7 feet per minute and a strong vacuum of about 10 inches of mercury was applied from under the deposited stock for about 3 minutes. Thereafter, with continued vacuum of about 0.7 inch of mercury, heated dry air (138° C.–149° C.) was passed through the pulp from the top pulp surface. In less than ten minutes after depositing the stock upon the wire, a tile product was produced having an average thickness of 0.65 inch (1.65 cm) that was totally dry.

When the general procedure of Example 7 was followed except for the addition of 2.92 pounds of hydropulped paper fibers as a dilute suspension, the tile product was nearly dry after the same flow-through air drying period but almost 30 minutes further drying in a convection oven was necessary to achieve total dryness.

In EXAMPLES 8-10 below, the following general procedure for pre-cooking the starch was used:

A 25% by weight slurry of Genvis 600 wheat starch (Ogilvie Mills) in water was prepared at room temperature and poured into a sufficient amount of hot water (196° F., 91° C.) to make a suspension having a 6% by weight consistency. The temperature was then 168° F. (76° C.) and the solution was quenched to lower the temperature to 150° F. (66° C.) very quickly. The viscosity of the starch solution at room temperature was 22.5 cp when measured with a #1 spindle on the Brookfield viscometer.

EXAMPLE 8

A dispersion containing about 3.5% by weight solids was prepared in the tank 10 by charging water and 134.9 parts of pre-cooked starch solution having a 6% by weight consistency, then 38.5 parts of Dow styrene/acrylic latex having a Tg of 100° C. (XU 30776.00L), 6.93 parts of stucco, and 152.4 parts of mineral wool. The total amount of water was about 5050 parts. The furnish was gently mixed for about 5 to 10 minutes by the impeller 12 and then pumped to the headbox 30 by the pump 22 through the pipe 28. A solution of 0.83 part solid cationic polyacrylamide sold under the trademark Percol 292 by Allied Colloid in 274 parts of water was metered into the pipe 28 from the tank 16 to mix with the furnish as it flowed into the headbox and thence onto the wire 40. Neither the bottom scrim 43 nor the top scrim 47 was used. The mass 41 began dewatering as it moved for a few seconds across section 42 of the mat forming machine. A top wire former, similar to the wire 40, was used instead of the smoothing roller 43 to dress the thickness of the mass and smoothen it. The high vacuum section 44 was not used and a cover was placed over the low vacuum section 46 so that hot air could be blown through the mass 41 while the vacuum was about 4 inches of mercury. The vacuum was maintained at that level in the enclosure 49 while hot air was blown into the mass by the blower 50. The temperature of the air was gradually increased from 61° to 116° F. (16° to 47° C.) as the mass 41 moved along section 46 and then to 370° F. (188° C.) in the enclosure 49. The total flow-through drying time was 10 minutes. The dry mass was cut into 0.73 inch (1.8 cm) thick test panels 2 feet wide and 4 feet long (61 cm × 122 cm).

The resulting dry panels had a density of 15 pounds per cubic foot (240 kg/m$^3$), a modulus of rupture of 231 psi (1.69 Pa), and a modulus of elasticity of 22,772 psi (157.3 Pa). Measurement of the hardness of a panel with an Instron machine gave a value of 130 pounds. The sag resistance of the panels was also very good, as shown by the minimal 0.015 inch sag after 24 hour storage at 90° F./90% relative humidity.

EXAMPLE 9

The general procedure of EXAMPLE 8 was followed except that 232.6 parts of the pre-cooked starch solution, 15.2 parts of the latex, 7.37 parts of stucco, and 160 parts of mineral wool were charged into the water to make a dispersion having a 3.5% solids consistency. The same flocculant was added as a solution of 0.72 part solid in 238.6 parts of water. The temperature in the first vacuum section increased from 55° to 103° (13° to 40° C.) as the mass 41 was moved through that section. The maximum temperature in the enclosure 49 was 340° F. (171° C.). The total drying time was about 5 minutes.

The 2'×4' test panels were 0.52 inch (1.3 cm) thick and had a density of 13 pounds per cubic foot (208 kg/m$^3$).

Another panel having a nominal half inch thickness and having the same dimensions was made by the general procedure of EXAMPLE 9. A sag of 0.039 inch in the panel was measured after it was stored at 90° F./90% R.H. for 24 hours.

EXAMPLE 10

The general procedure of EXAMPLE 8 was followed except that 231.6 parts of the starch solution, 15.1 pounds of the latex, 36.69 parts of ball clay and 130 parts of mineral wool were charged into the water. A 0.3% by weight solution (275 parts) of the same flocculant was added. The temperature in the first vacuum section increased from 61° to 116° F. (16° to 47° C.) and the maximum temperature in the enclosure 49 was 370° F. (118° C.). Density of the 0.63 inch thick test panels was 17 pounds per cubic foot.

From the foregoing, it is apparent that the present invention provides a novel method for manufacturing sag-resistant acoustical mineral fiber tile products. Various tile thicknesses from about ⅛ inch through 2 inches or more, and preferably ¾ inch, may be formed. Products having densities ranging from about 3 through about 22 pounds per cubic foot or more, and preferably from about 12 to about 20 pcf, may be formed, the heavier ones preferably from a nodulated mineral wool.

The subject matter claimed is:

1. A method for manufacturing a lightweight, sag-resistant structural panel on a moving foraminous support wire which comprises the steps of:

forming a dilute aqueous furnish comprising a mineral fiber material;

adding a binder which consists of from about 20% to 100% of an anionically stabilized resin latex and from 0% to about 80% of starch based on the dry weight of total binder solids;

adding a cationic flocculating agent selected from guar gum and a polyacrylamide having a molecular weight of about 1–12 million and at least about 5 mole percent of a cationic component to the furnish in an amount sufficient to coat the mineral fiber material and flocculate the latex binder to coat the mineral fiber surfaces;

after addition of the flocculating agent, providing a period of up to about one minute for a relatively quiescent flow of the furnish;

depositing the furnish on a water flooded section of the support wire to form a self-sustaining, open structure of entangled mineral fiber material having water-filled interstices; and stripping the water from the interstices and drying the structure without collapsing it by passing air through it at a rate of from about 50 to about 350 cubic feet per minute per square foot of the surface at which the air is directed.

2. The method of claim 1 wherein a mineral aggregate selected from expanded perlite, clay and calcium sulfate hemihydrate is added to the furnish.

3. The method of claim 1 wherein the amount of flocculating agent solids is from about 0.1% to about 15% by dry weight of the binder resin solids.

4. The method of claim 1 wherein the amount of flocculating agent solids is from about 2% to about 4% based on the weight of the binder resin solids.

5. The method of claim 1 wherein the amount of binder, based on the dry weight of the total solids, is from about 1% to about 35%.

6. The method of claim 1 characterized further by applying a vacuum pressure differential of from about 0.4 to about 20 inches of Hg to the open structure on the foraminous wire to help strip the interstitial water from the structure while maintaining the interstices.

7. The method of claim 1 wherein the starch is less than 70 weight percent of the total binder solids.

8. The method of claim 1 characterized further in that the starch is pre-cooked as a suspension in water before addition to the furnish, the pre-cooking being done to achieve adhesive properties but without a sharp viscosity increase.

9. The method of claim 1 wherein the binder is 100% latex.

10. A method for manufacturing a structural panel, the method comprising the steps of:

a) forming a dilute furnish including a mineral fiber material;

b) adding to the furnish a quantity of an anionically stabilized latex resin;

c) admixing to the furnish a quantity of a cationic flocculating agent selected from quar gum and a polyacrylamide having a molecule weight of about 1-12 million and at least about 5 mole percent of a cationic component, wherein the cationic flocculating agent coats the mineral fiber material and flocculates the anionically stabilized latex resin to coat the surface of the mineral fiber material;

d) after addition of the flocculating agent, providing a period of up to about one minute for a relatively quiescent flow of the furnish; and e) forming a structural panel from the furnish.

11. The method of claim 10 wherein the quantity of the cationic flocculating agent is from about 0.1 to about 15% by dry weight of the binder resin solids.

12. The method of claim 10 wherein the quantity of the cationic flocculating agent is from about 2 to 4% by dry weight of the total binder solids.

13. The method of claim 10 wherein the cationic flocculating agent is a polyacrylamide and a mineral aggregate selected from expanded perlite, clay and calcium sulfate hemihydrate is added to the furnish.

14. The method of claim 10 wherein the cationic flocculating agent is a polyacrylamide and the starch is less than 70 weight percent of the total binder solids.

* * * * *